Patented Mar. 6, 1951

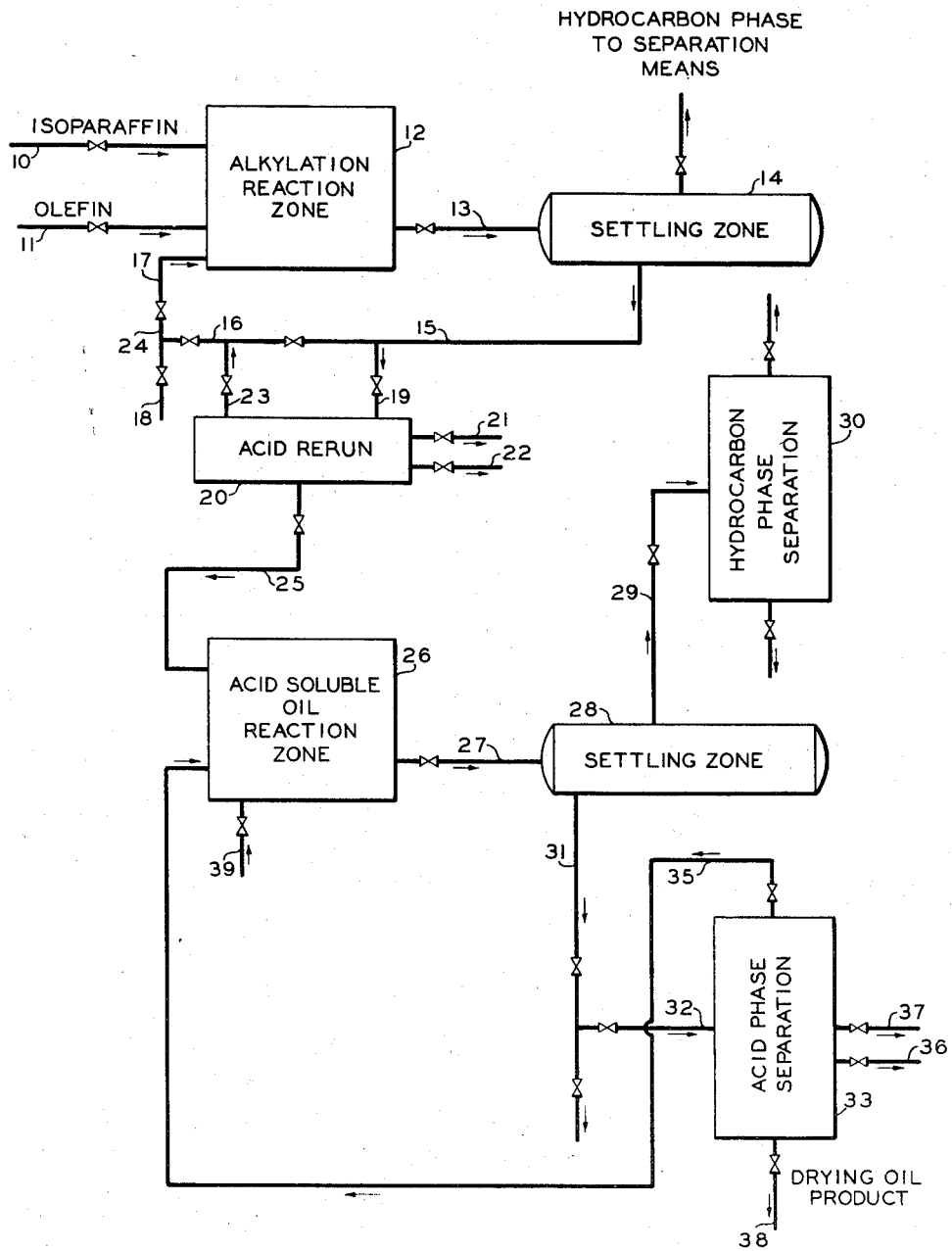

2,544,552

UNITED STATES PATENT OFFICE 2,544,552

PRODUCTION OF DRYING OILS BY TREATMENT OF ACID-SOLUBLE OILS WITH HYDROFLUORIC ACID

Paul H. Carnell, Alma, Mich., assignor to Phillips Petroleum Company, a corporation of Delaware Application December 19, 1947, Serial No. 792,824

7 Claims. (Cl. 260—683.4)

This invention relates to the conversion of hydrocarbon oils. In one aspect this invention relates to the conversion of acid soluble oils. In another aspect this invention is related to the utilization of acid soluble oils obtained as a by-product of a hydrocarbon conversion process employing a catalyst comprising hydrofluoric acid. In a more specific aspect this invention relates to the production of hydrocarbons boiling over a wide range of temperature, and to the production of drying oils.

In various hydrocarbon conversion processes employing catalysts such as sulfuric acid, hydrofluoric acid, or aluminum chloride, either alone or in the presence of promoters or modifiers, a by-product oil is formed which is undesirable from the standpoint of further utilization and is usually discarded. When aluminum chloride is employed as a catalyst in an isomerization or alkylation process a by-product oil is obtained and forms a complex with the aluminum chloride. Hydrocarbon conversion reactions conducted in the presence of sulfuric acid often form a heavy oil and/or a sludge as a by-product and similarly, hydrocarbon conversion reactions conducted in the presence of hydrofluoric acid as a catalyst produce an undesirable oil by-product soluble in the hydrofluoric acid catalyst.

The process of this invention is concerned with the utilization of by-product oils formed by any hydrocarbon conversion reaction conducted in the presence of a catalyst comprising hydrofluoric acid, and particularly with the by-product oils obtained during the hydrofluoric acid alkylation of an isoparaffin with an olefin. Isoparaffin alkylating reactants usually comprise isobutane and/or isopentane, and olefin alkylating reactants usually comprise low-boiling olefins, such as propene, butenes, and amylenes. The acid-soluble oils are so-named because of their high solubility in the hydrofluoric acid catalyst or acid phase.

When referring herein to a catalyst comprising hydrofluoric acid, not only hydrofluoric acid alone is meant, but any of the various hydrofluoric acid-containing catalysts employed in hydrocarbon conversion processes. The hydrofluoric acid-containing catalysts herein referred to comprise hydrofluoric acid alone, or mixtures of hydrofluoric acid as the chief component with sulfuric acid, boron fluoride, metalloid halides of the type of phosphorus pentafluoride, or with other promoters or modifiers. All such modifiers or promoters comprise minor proportions of the hydrofluoric acid-containing catalysts, such proportions usually comprising 1 to 5 per cent by weight of a catalyst mixture, although in some instances comprising as high as 10 per cent by weight or higher. Hydrofluoric acid-containing catalysts comprising mixtures as described above are employed in a manner substantially the same as that for hydrofluoric acid alone with only minor modifications that will be obvious from the nature of the additional component or components of the catalyst.

This invention has for an object to provide a novel hydrocarbon conversion process.

Another object is to provide a process for the conversion of acid-soluble oils in the presence of a catalyst comprising hydrofluoric acid.

Still another object is to provide a process for the manufacture of hydrocarbons boiling over a wide temperature range.

Another object is to provide a process for the manufacture of drying oils.

Other objects and advantages of this invention will become apparent, to one skilled in the art, from the accompanying disclosure and discussion.

In accordance with this invention an acid-soluble oil obtained as a by-product of a hydrocarbon conversion process employing a catalyst comprising hydrofluoric acid is separately treated in the presence of hydrofluoric acid at conditions of temperature, pressure, and contact time so as to produce a conversion product comprising an olefinic heavy oil product highly unsaturated and suitable for use as a drying oil. The process of this invention provides thereby a means of utilization of the relatively undesirable by-product oils which are usually discarded. These acid-soluble oils vary somewhat in composition and their properties are dependent upon the particular conversion process employed. However, the following properties typify the acid-soluble oils used in the process of this invention:

*Properties of HF acid-soluble oil*

| | |
|---|---|
| API gravity @ 60° F. | 15–30 |
| Viscosity SUS @ 100° F.[1] | 350–1000 |
| Viscosity SUS @ 210° F.[1] | 60–80 |
| Flash point, COC, °F.[2] | 190–210 |
| Fire point, COC,[2] | 220–240 |
| Pour point, °F.[3] | 5+ |
| Total solids,[4] per cent | 35–80 |
| Iodine number[5] | 170–260 |
| Aniline point, °C.[6] | 50–100 |
| Free HF[7] | None |

[1] ASTM designation 446–39.
[2] ASTM designation D92–45.
[3] ASTM designation D97.
[4] ASTM designation D154.
[5] Wijs method—gms. iodine per 100 gms. sample.
[6] ASTM designation D611–44T.
[7] ASTM designation D663–44T.

In order to more clearly indicate the origin of the acid-soluble oils of this invention a description of a typical hydrocarbon conversion process employing a catalyst comprising hydrofluoric acid follows hereinafter. Perhaps the most important of such processes is the hydrofluoric acid alkylation of isoparaffins and olefins.

The so-called hydrofluoric acid alkylation involves the reaction of an isoparaffin, particularly isobutane and/or isopentane with an alkylating reactant, particularly an olefin, such as propylene, various butylenes, various amylenes, and other higher boiling olefins, to produce normally liquid paraffins which generally have high octane numbers and are valuable as constituents of aviation fuel. In such alkylation processes the reactants are intimately contacted at temperatures between about 50 and about 150° F. and under sufficient pressure to maintain reactants in the liquid phase with liquid concentrated hydrofluoric acid for a reaction period ranging from about 1 to about 30 minutes. The mol ratio of paraffin to olefin in the feed is usually about 3:1 to about 20:1, and may be as high as 100:1 or higher in the reaction zone itself. Resulting reaction effluent is passed to a settling zone wherein a liquid hydrocarbon-rich phase and a heavy liquid hydrofluoric acid-rich phase are separated. Hydrocarbon phase from the settling zone may be then subjected to fractional distillation to remove hydrogen fluoride dissolved therein, which is generally present to the extent of about 1 to about 3 per cent by volume. After the removal of hydrogen fluoride, the remaining portion of hydrogen fluoride free hydrocarbon phase is passed to a separation or distillation zone for removal and recovery of alkylation product. This product comprises in general, alkylated hydrocarbons, such as isooctanes, heptanes, hexanes, and some pentanes, of high anti-knock quality.

Acid phase from the separation zone is recycled directly to the alkylation reaction zone; however, since the acid phase becomes contaminated with water and other impurities, a portion thereof is passed to a purification system for the removal of water and other impurities. One of the impurities besides water which is removed from the acid phase in the purification system is the so-called acid-soluble oils. These acid-soluble oils, a by-product of the alkylation reaction, vary considerably in composition but are, in general, normally liquid materials and are soluble in hydrogen fluoride. The presence of acid-soluble oils as impurities reduces the catalytic activity of the hydrofluoric acid catalyst and must necessarily be removed therefrom in a major proportion as required for maintaining the desired catalyst activity. The amount of acid-soluble oils usually present in the acid phase varies from about 1-2 weight per cent to as high as about 10 weight per cent of the acid phase.

The hydrofluoric acid catalyst initially anhydrous and having an HF content in the range of 95-99 per cent, gradually becomes contaminated with the accumulation of water, organic fluorine compounds, and acid-soluble oils. When the hydrofluoric acid content, or acidity of the acid phase, becomes as low as about 75 per cent by weight, under-reacting as a result of reduced catalyst activity is encountered and the acidity must be necessarily restored to and maintained at values higher than 75 weight per cent, usually in the range of 85-90 weight per cent. The acidity of the catalyst is usually maintained in the range of 80-90 per cent by passing at least a portion of the acid phase to a purification means or an acid rerun unit wherein the impurities, including the acid-soluble oils in the process of my invention are removed and the purified hydrofluoric acid returned to the active catalyst. The acid phase contains in addition to the impurities mentioned above, physically dissolved minor amounts of hydrocarbon reactants which are separated by an extraction means employing a heavy fraction of the final product of the conversion process as an extracting agent. For example, in a hydrofluoric acid alkylation process heavy alkylate may serve as the extracting agent. The acid layer subsequent to extraction is heated to a temperature in the range of 250-300° F. and then flashed in a tower wherein the free acid and water are vaporized and passed overhead for subsequent separation; acid-soluble oils, oils formed by decompositions of soluble oils, and other heavy materials not vaporized descend into a packed acid-oil fractionator. The fractionator kettle is operated at temperatures approximating 400° F. and higher and provides therein a means of vaporizing any free hydrofluoric acid and/or water remaining in solution in the heavy residue and of decomposing the organic fluorine compounds therein. Free hydrofluoric acid and water are passed overhead. The bottom product of the fractionator comprises acid-soluble oils which can be used as charge stock in practicing the process of my invention. The acid-soluble oil bottom product is substantially free of water, fluorine-containing compounds, and traces of hydrofluoric acid, boils mostly in the gas-oil range, and is at least partially cyclic.

This invention constitutes a process for utilization of acid-soluble oil by-product recovered in an acid rerun system such as that above described.

In the practice of my invention an acid-soluble oil is contacted with hydrofluoric acid at a temperature in the range of 200-600° F., at pressures at least sufficient for maintaining the reaction system in the liquid phase, at a contact time usually in the range of 20-180 minutes and at a suitable liquid volume ratio of acid-soluble oil to hydrofluoric acid usually in the range of about 0.2:1 to 2.0:1. Under such conditions of reaction substantially complete conversion of acid-soluble oils to useful products is obtained.

Upon passing the reaction effluent to a settling zone two phases separate. Hydrocarbon products comprising substantially paraffins form the top or hydrocarbon layer, and the acid phase, in which heavy product oils highly unsaturated and suitable for use as drying oils are dissolved, forms the bottom or acid layer. The hydrocarbon product forming the top or lighter phase is substantially completely paraffinic and usually comprises in a major proportion hydrocarbons boiling in the motor fuel range. The unsaturated product dissolved in the acid layer is usually dark in color, viscous, and highly unsaturated. In some instances the heavy unsaturated drying oil product is a still darker color, depending upon the particular conversion conditions and the source of the particular acid-soluble oil treated.

When referring herein to hydrofluoric acid, it is meant liquid hydrogen fluoride either alone or in mixture with minor amounts of compounds exerting a promoting or modifying effect upon the activity thereof. Such compounds are for example, boron fluoride, metalloid halides, alkyl halides etc.

The product drying oils of my process are weather resistant and when serving as coating materials do not check or fail upon prolonged exposure to the weather. Tests over periods of several weeks duration have been conducted upon metal strips treated with the drying oils of my invention. These strips were initially sprayed with corrosive agents such as aqueous sodium chloride and thereafter similarly sprayed twice a week over a period of several weeks duration of exposure. At the conclusion of these tests the unsaturated product oils of this invention exhibited stability with respect to checking or failure upon such exposure to weather conditions, as is typical of the stability of recognized drying oils or coatings available on the market. The drying oils or coatings provided by the process of my invention may be thereby considered competitive with other drying oils or film-forming materials on the market.

Figure 1 is a diagram of one form of apparatus in which the process of my invention may be practiced. It is to be understood that the flow diagram is diagrammatic only and may be altered in many respects, by those skilled in the art, and yet remain within the intended scope of my invention.

In this invention as applied to the alkylation of isobutane with butenes in the presence of hydrofluoric acid as an alkylation catalyst, a suitable and typical combined feed stock for the hydrofluoric acid alkylation in which the acid-soluble oils are a by-product appears in Table I below.

Table I

| Component: | Mol per cent |
|---|---|
| Isobutane | 68 |
| Isobutene | 4 |
| Normal butene | 7 |
| Normal butane | 20 |
| Other hydrocarbons | 1 |

Referring now to the drawing, such a hydrocarbon feed enters alkylation reaction zone 12 through lines 10 and 11, and is intimately contacted therein with hydrofluoric acid having an acidity in the range of 80 to 90 per cent by weight. The overall mol ratio of isobutane to olefin is usually from about 4:1 to about 20:1 in the combined feed and recycle and may be as high as 100:1 or higher in the reaction zone. The time of residence of the reaction mixture in the reaction zone 12 is usually from about 5 to about 15 minutes, but it may be for one hour or longer periods as desired. The volume ratio of acid to hydrocarbon is between approximately 0.5:1 and about 2:1, generally about 1:1, although other ratios may be maintained. The hydrocarbon feed stock enters the alkylation reaction zone at a temperature of about 80 to about 100° F. and a pressure of about 90 to 100 p. s. i. Should it be desired however, both higher pressures and higher temperatures may be used. In general only sufficient pressure to assure operation in liquid phase is necessary. From reaction zone 12 the hydrocarbon conversion effluent is passed through line 13 to a settling zone 14 in which the effluent separates into two phases, a light hydrocarbon-rich phase and a heavier hydrofluoric acid-rich phase. The hydrofluoric acid-rich phase, hereinafter referred to as the acid phase, is withdrawn from the bottom of settling zone 14 through line 15 to be recycled as a catalyst for the alkylation reaction through lines 16 and 17. Fresh make-up hydrofluoric acid may be added to the system through line 18 when desired. Since it is desirable to remove water and acid-soluble oils from the acid phase, a portion or all of the acid phase in line 15 is passed through line 19 to a purification or acid rerun unit 20; in purification unit 20 water and other impurities are removed through lines 21 and 22. A purified acid phase is passed from acid rerun unit 20 through lines 23, 16, 24, and 17 to alkylation reaction zone 12. Liquid hydrocarbon-rich phase passes from settling zone 14 to a separation means not shown wherein a vaporous azeotropic mixture of hydrocarbon and hydrogen fluoride is separated from the hydrocarbon phase and from which the vaporous azeotropic mixture is returned to settling zone 14. The hydrocarbon phase is substantially freed of hydrogen fluoride, and is further freed of any organic fluorine compounds formed as by-products of the conversion, by treatment in the presence of bauxite in another step not shown. The liquid hydrocarbon stream substantially freed of hydrogen fluoride and organic fluorine compounds is further fractionated (not shown) to separate and recover the various products of the conversion and has a composition approximating the following shown in Table II.

Table II

| Hydrocarbon components: | Mol per cent |
|---|---|
| Propane and lighter hydrocarbons | 1 |
| Isobutane | 57 |
| Normal butane | 20 |
| Alkylate | 22 |

The acid rerun unit 20 may comprise any suitable method and apparatus known to those skilled in the art for the removal and separation of water and acid-soluble oils from the acid phase. Generally unit 20 will be a series of fractionation steps, the first step of which removes the acid-soluble oils from the acid phase as a bottom product.

In Table III are acid-soluble oil data typical of that acid-soluble oil withdrawn from acid rerun unit 20 through line 25.

Table III

| | |
|---|---|
| Gravity, °API | 16.4 |
| Flash Point, °F.[1] | 230+ |
| Pour Point, °F.[1] | 80 |
| Viscosity at 210° F., SUS[1] | 242 |
| Fluorine, weight per cent | 0.1 |
| Iodine Number[2] | 113 |
| ASTM Distillation, °F., vol. per cent distilled: | |
| First drop | 220 |
| 5 | 480 |
| 10 | 546 |
| 20 | 584 |
| 30 | 604 |
| 40 | 618 |
| 50 | 627 |
| 60 | 635 |
| 70 | [3] 640 |

[1] ASTM test method referred to hereinbefore.
[2] Wijs method, grams iodine reacting with 100 grams sample.
[3] Cracking begins.

Some sulfur may be present in the acid-soluble oil in line 25 as a result of a minor amount of sulfur present as SO₂ in fresh hydrofluoric acid stocks, which cause sulfur compounds to appear in the alkylate for a short time and to be present as a contaminant of the acid-soluble oil.

The acid-soluble oil comprises usually a concentration in the acid phase within the limits of 2 to 10 per cent by weight. Such an acid-soluble oil or portion thereof from line 25 or any other suitable source (not shown), is introduced to acid-soluble oil reaction zone 26 through line 25 and is intimately contacted therein with hydrofluoric acid catalyst having an acidity, in the range of about 80 to about 95 per cent. The overall volume ratio of acid-soluble oil to hydrofluoric acid catalyst is preferably in the range of 0.2:1 to 2.0:1. The time of residence in the reaction mixture is usually in the range of 20 to 180 minutes and the temperature in the range of 200 to 600° F. Generally, superatmospheric pressures are employed usually in the range of 100 to 2000 p. s. i. From reaction zone 26 total reaction effluent is passed through line 27 to settling zone 28 in which the effluent separates into two liquid phases; a light hydrocarbon-rich phase and a heavier hydrofluoric acid phase. Hydrocarbon phase is passed from settling zone 28 through line 29 to the hydrocarbon phase separation means 30 comprising a combination of fractionation steps whereby paraffinic hydrocarbon products boiling over a range varying from normally gaseous hydrocarbons to heavy hydrocarbons boiling in the lube oil range, with a major proportion boiling in the motor fuel range, are separated and removed as products of the process. The acid phase is withdrawn from the bottom of settling zone 28 through line 31 and passed through line 32 to an acid phase separation means 33. Pure hydrogen fluoride is removed as an overhead fractionation product through line 35 and recycled to reaction zone 26. Fresh make-up hydrofluoric acid is added to reaction zone 26 when desired, through line 39. Water and other impurities are removed through lines 36 and 37. The product drying oils of my invention are removed as a kettle product of fractionation through line 38.

For convenience and clarity certain apparatus such as pumps, surge tanks, accumulators, valves, etc., have not been shown in the drawing. Obviously, such modifications of the present invention may be practiced without departing from the scope of the invention.

Advantages of this invention are illustrated by the following example. The reactants and their proportions and other specific ingredients are presented as being typical and should not be construed to limit the invention unduly.

*Example I*

Acid-soluble oil obtained as a by-product of the alkylation of isobutane with butenes in the presence of hydrofluoric acid as a catalyst was contacted with hydrofluoric acid at a temperature of 342° F., at a pressure of 860 p. s. i., and for a duration of 120 minutes. The reaction effluent subsequent to cooling, separated in two phases, an acid phase and a hydrocarbon phase. The acid phase was fractionated and a dark brown, viscous product oil was obtained as a kettle product, which dried rapidly upon standing exposed to air at room temperature. A portion of the brown product oil was spread in a thin film on a small piece of plate steel which had been cleaned, buffed, de-greased, and dried. The coated steel plate was then exposed to the weather for a duration of 5 weeks during which it was sprayed twice a week with a 20 per cent solution of sodium chloride. No checking or failures of any type, of the coating material, were observed at the end of the 5 weeks period.

The hydrocarbon layer was caustic washed and fractionated. Light components obtained were chiefly propane, isobutane, and isopentane. About 62 per cent of the hydrocarbon layer boiled below 400° F., the major proportion of which boiled in the motor fuel range. Some hydrogen sulfide was present as a result of (1) the presence of sulfur as $SO_2$ in the fresh hydrofluoric acid catalyst, or (2) desulfurization of the acid-soluble oil.

As will be evident to those skilled in the art, various modifications can be made or followed, in the light of the foregoing disclosure and discussion, without departing from the spirit or scope of the disclosure or from the scope of the claims.

I claim:

1. A process for the production of a drying oil which comprises reacting in an alkylation step an isoparaffin and an olefin in the presence of hydrofluoric acid as a catalyst under alkylating conditions to form alkylate product, separating from effluent of said alkylating step a hydrocarbon phase containing said alkylate product and a hydrofluoric acid phase containing acid-soluble oil as a by-product of said alkylation step, separating said acid-soluble oil from said hydrofluoric acid phase; contacting said acid-soluble oil as a liquid in a conversion step in the presence of a catalyst comprising liquid hydrofluoric acid for a duration of at least 20 minutes at a temperature in the range of 200-600° F., at a pressure sufficient to maintain liquid phase conditions and at a ratio of said acid-soluble oil to said catalyst in the range of 0.2:1 to 2.0:1, separating from the effluent of said conversion step a hydrocarbon phase and an acid phase, the last said acid phase containing an unsaturated rapid drying oil product dissolved therein, and recovering said rapid drying oil from said acid phase.

2. A process for the production of a drying oil, comprising passing to a reaction zone an acid-soluble oil, obtained as a by-product of a process employing a catalyst comprising hydrofluoric acid for the conversion of an acyclic hydrocarbon, said acid-soluble oil having a gravity in the range of 15-30° API, a viscosity at 100° F. in the range of 350-1000 SUS, a flash point in the range of 190-210° F., a fire point in the range of 220-240° F., a pour point at a temperature above 4° F., a total solids content in the range of 35-80 per cent by weight, an iodine number within the limits of 160 and 270, and an aniline point within the range of 50-100; therein contacting said oil as a liquid with liquid hydrofluoric acid in a liquid volume ratio in the range of 0.2:1 to 2.0:1, at a temperature in the range of 200-600° F., and for a reaction time of 20 to 180 minutes; passing total effluent from said reaction zone to a settling zone wherein a hydrocarbon phase and an acid phase separate, said acid phase containing in solution a drying oil as a product, passing said acid phase to a separation means, and recovering therefrom a drying oil.

3. The process of claim 2 wherein said hydrocarbon conversion process comprises the alkylation of isobutane with butenes.

4. A process for the production of a drying oil, comprising introducing an isoparaffin and an olefin in an overall mole ratio of isoparaffin to olefin within the range of 3:1 to 20:1 into an alkylation zone containing an alkylation catalyst comprising hydrofluoric acid and therein reacting said isoparaffin with said olefin at a temperature within the range of 50 to 150° F., for a residence time within the range of 1 to 30 minutes, to form alkylate; separating effluent from said alkylation zone into a hydrocarbon phase containing said alkylate and a hydrofluoric acid phase containing acid-soluble oil as a by-product of reaction in said alkylation zone, separating said acid-soluble oil from said hydrofluoric acid phase, contacting said acid-soluble oil with a catalyst comprising hydrofluoric acid in a contacting zone separate from said alkylation zone in a volume ratio of acid-soluble oil to said catalyst in the range of 0.2:1 to 2:1 at a temperature in the range of from 200 to 600° F., at a pressure sufficient to maintain reactants and catalyst in liquid phase, and for a contact time of from 20 to 180 minutes; separating from effluent of said contacting zone a saturated hydrocarbon phase and a hydrofluoric acid phase, removing hydrofluoric acid from the last said hydrofluoric acid phase and recovering a remaining drying oil as a product of the process.

5. A process for the production of a drying oil, comprising passing to a reaction zone an acid-soluble oil obtained as a by-product of a process employing a catalyst comprising hydrofluoric acid for the conversion of an acyclic hydrocarbon, said acid-soluble oil having a gravity in the range of 15 to 30° API, a viscosity at 100° F. in the range of 350 to 1000 SUS, a flash point in the range of 190 to 210° F., a fire point in the range of 220 to 240° F., a pour point at a temperature above 4° F., a total solids content in the range of 35 to 80 per cent by weight, an iodine number within the limits of 160 to 270, and an aniline point within the range of 50 to 100; in said reaction zone contacting said acid-soluble oil with hydrofluoric acid in a liquid volume ratio to said hydrofluoric acid in the range of 0.2:1 to 2.0:1, at a temperature in the range of 200 to 600° F., at a pressure sufficient to maintain reactants and catalyst in liquid phase, and for a reaction time of from 20 to 180 minutes; passing total effluent from said reaction zone into a settling zone wherein a saturated hydrocarbon layer and a hydrofluoric acid layer are separated, said hydrofluoric acid layer containing in solution a drying oil as a product of the process, recovering hydrocarbons from said saturated hydrocarbon layer, passing at least a portion of last said acid layer to a separation means, and recovering therefrom a drying oil.

6. A process for the production of a drying oil comprising introducing an isoparaffin and an olefin in an overall mole ratio of isoparaffin to olefin within the range of 3:1 to 20:1 into an alkylation zone containing an alkylation catalyst comprising hydrofluoric acid and therein reacting said isoparaffin with said olefin at a temperature within the range of 50 to 150° F., for a residence time within the range of 1 to 30 minutes, to form alkylate; separating effluent from said alkylation zone into a hydrocarbon phase containing said alkylate and a hydrofluoric acid phase containing impurities comprising water, organic fluorine compounds and a by-product oil, removing said hydrofluoric acid phase from the zone of said separating and heating same to a temperature in the range of 250 to 350° F. and passing acid phase thus heated to a flash distillation zone and therein separating hydrofluoric acid and water from said acid phase as an overhead flash distillation product, passing residual oil product from said flash distillation zone to a fractionation zone wherein a kettle temperature above 350° F. and not higher than about 400° F. is employed and in said fractionation zone decomposing organic fluorine compounds and recovering same as overhead fractionation product together with any free hydrofluoric acid and water not removed from said flash distillation zone above described, recovering oil kettle product free of water, hydrofluoric acid and organic fluorine compounds from said fractionation zone, said oil kettle product being referred to hereinafter as acid-soluble oil and having an API gravity at 60° F. in the range of 15 to 30, a viscosity at 100° F. in the range of 350 to 1000 SUS, a flash point in the range of 190 to 210, a fire point in the range of 220 to 240° F., a total solids content in the range of 35 to 80 per cent by weight, an iodine number in the range of 170 to 260 and an aniline point in the range of 122 to 212° F.; contacting said acid-soluble oil with a catalyst comprising hydrofluoric acid in a contacting zone separate from said alkylation zone in a volume ratio of acid-soluble oil to said catalyst in the range of 0.2:1 to 2:1 at a temperature in the range of from 200 to 600° F., at a pressure sufficient to maintain reactants and catalyst in liquid phase, and for a contact time of from 20 to 180 minutes; separating from effluent of said contacting zone a saturated hydrocarbon phase and a hydrofluoric acid phase, removing hydrofluoric acid from the last said hydrofluoric acid phase and recovering a residual drying oil as a product of the process.

7. A process for the production of a drying oil, comprising converting an acyclic hydrocarbon in the presence of a catalyst comprising hydrofluoric acid, separating effluent from said converting into a hydrocarbon phase containing hydrocarbon conversion product and a hydrofluoric acid phase containing acid-soluble oil as a by-product of said conversion, separating said acid-soluble oil from said hydrofluoric acid phase, said acid-soluble oil thus separated having a gravity in the range of 15 to 30° API, the viscosity at 100° F. in the range of 350 to 1,000 SUS, a pour point at a temperature above 4° F., a total solids content in the range of 35 to 80 per cent by weight, an iodine number within the limits of 160 and 270, and an aniline point within the range of 50 to 100; contacting acid soluble oil thus separated as a liquid with liquid hydrofluoric acid in a liquid volume ratio to the last said acid in the range of 0.2:1 to 2.0:1, at a temperature in the range of 200 to 600° F. and for a reaction time of from 20 to 180 minutes; passing total effluent from said contacting to a settling zone wherein a hydrocarbon phase and an acid phase separate, the last said acid phase containing in solution a drying oil as a product of the process, and recovering said drying oil.

PAUL H. CARNELL.

REFERENCES CITED

The following references are of record in the file of this patent:

UNITED STATES PATENTS

| Number | Name | Date |
|---|---|---|
| 2,090,333 | Osterstrom | Aug. 17, 1937 |
| 2,400,521 | Kuhn | May 21, 1946 |
| 2,432,505 | Burk et al. | Dec. 16, 1947 |
| 2,440,459 | Bloch | Apr. 27, 1948 |
| 2,440,477 | Johnstone | Apr. 27, 1948 |
| 2,481,498 | Carnell | Sept. 13, 1949 |

FOREIGN PATENTS

| Number | Country | Date |
|---|---|---|
| 443,679 | Great Britain | Mar. 4, 1936 |